United States Patent
Kishiyama et al.

(10) Patent No.: US 9,048,912 B2
(45) Date of Patent: Jun. 2, 2015

(54) MOBILE TERMINAL APPARATUS, RADIO BASE STATION APPARATUS AND COMMUNICATION CONTROL METHOD

(75) Inventors: Yoshihisa Kishiyama, Tokyo (JP); Teruo Kawamura, Tokyo (JP); Motohiro Tanno, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 697 days.

(21) Appl. No.: 13/378,679

(22) PCT Filed: Jun. 23, 2010

(86) PCT No.: PCT/JP2010/060620
§ 371 (c)(1),
(2), (4) Date: Mar. 14, 2012

(87) PCT Pub. No.: WO2010/150806
PCT Pub. Date: Dec. 29, 2010

(65) Prior Publication Data
US 2012/0163318 A1    Jun. 28, 2012

(30) Foreign Application Priority Data

Jun. 23, 2009 (JP) ................................ 2009-149000
Jan. 6, 2010 (JP) ................................ 2010-001127
Apr. 2, 2010 (JP) ................................ 2010-086034

(51) Int. Cl.
H04W 4/00     (2009.01)
H04B 7/06     (2006.01)
H04J 11/00    (2006.01)
H04J 13/00    (2011.01)
H04L 5/00     (2006.01)
(Continued)

(52) U.S. Cl.
CPC ............ *H04B 7/0671* (2013.01); *H04J 11/003* (2013.01); *H04J 13/0003* (2013.01); *H04L 5/0023* (2013.01); *H04L 5/0051* (2013.01); *H04L 27/2613* (2013.01); *H04J 13/0055* (2013.01); *H04J 13/0062* (2013.01); *H04L 2025/03789* (2013.01)

(58) Field of Classification Search
USPC .................................. 370/328–339, 342–345
See application file for complete search history.

(56) References Cited

U.S. PATENT DOCUMENTS

2007/0259635 A1*  11/2007  Oh et al. ..................... 455/186.1
2008/0318608 A1   12/2008  Inoue et al.

FOREIGN PATENT DOCUMENTS

JP      2008-193414 A      8/2008
JP      2009-4926 A        1/2009

OTHER PUBLICATIONS

3GPP TS 36.211 V8.7.0 (May 2009), 3rd Generation Partnership Project; 3GPP TS 36.211 V8.7.0 (May 2009), Release 8.*

(Continued)

*Primary Examiner* — Iqbal Zaidi
(74) *Attorney, Agent, or Firm* — Osha Liang LLP

(57) ABSTRACT

Provided are a mobile terminal apparatus, a radio base station apparatus and a communication method, capable of orthogonalizing uplink reference signals between plural antennas in MIMO transmission. The mobile terminal apparatus has a reference signal generator (11) for generating DM-RSs using ZC sequences and a cyclic shift section (13) for cyclically shifting the DM-RSs by unit of plural antenna ports (19) to orthogonalize the DM-RSs for the antenna ports (19) between the antenna ports (19), and the cyclically shifted DM-RSs are transmitted via the respective antenna ports (19) to a radio base station apparatus eNB in an uplink.

12 Claims, 13 Drawing Sheets

(51) Int. Cl.
*H04L 27/26* (2006.01)
*H04L 25/03* (2006.01)

(56) References Cited

OTHER PUBLICATIONS

Notification of Reasons for Rejection for Japanese Application No. 2010-086034 dated Jul. 24, 2012, with English translation thereof (6 pages).
3GPP TSG RAN WG1 Meeting #59, R1-094911 (Original R1-092801), "UL RS Enhancement for LTE-Advanced," NTT DOCOMO, NEC Group; Jeju, Korea, Nov. 19-13, 2009 (6 pages).
3GPP TSG RAN WG1 #59 meeting, R1-094951, "Orthogonal cover codes for uplink DM-RS," Mitsubishi Electric; Jeju, South Korea, Nov. 9-13, 2009 (3 pages).
3GPP TSG RAN WG1 Meeting #59, R1-094706, "Uplink DM RS enhancement for LTE-Advanced,": Huawei; Jeju, Korea, Nov. 9-13, 2009 (3 pages).
3GPP TSG RAN WG1 Meeting #59, R1-094508, "Views on UL DM-RS," Panasonic; Jeju, Korea, Nov. 9-13, 2009 (4 pages).
3GPP RAN WG1 #59, R1-094855, "UL DM RS for LTE-A," Motorola; Jeju, South Korea, Nov. 9-13, 2009 (6 pages).
3GPP TSG RAN WG1 Meeting #58, R1-093307 (R1-092559), "Uplink DM RS performance evaluation from CoMP viewpoint," Nokia Siemens Networks, Nokia; Shenzhen, China, Aug. 24-28, 2009 (6 pages).
3GPP TSG RAN WG1 #49bis, R1-072849, "Sounding Reference Signal Assignmnets in E-UTRA Uplink," Texas Instruments; Orlando, USA, Jun. 25-29, 2007 (7 pages).
Notification of Reasons for Rejection for Japanese Application No. 2010-086034 dated Oct. 16, 2012, with English translation thereof (6 pages).
3GPP TSG RAN1#49bis, R1-072684, "Uplink Reference Signal Planning Aspects," Motorola; Orlando, USA, Jun. 25-29, 2007 (12 pages).
3GPP TSG RAN WG1 Meeting #53, R1-081797, "Initialization of the pseudo-random sequence generator for CS hopping," Panasonic; Kansas City, USA, May 5-9, 2008 (4 pages).
3GPP TSG RAN WG1 #49bis, R1-072849, "Sounding Reference Signal Assignments in E-UTRA Uplink," Texas Instruments; Orlando, USA, Jun. 25-29, 2007 (7 pages).
3GPP TSG RAN WG1 Meeting #57, R1-091843, "Discussion on UL DM RS for SU-Mimo," Texas Instruments; San Francisco, USA, May 4-8, 2009 (3 pages).
3GPP TSG RAN WG1 Meeting #51, R1-074865, "UL DM RS for Multi-bandwidth Multi-user MIMO," Nokia Siemens Networks, Nokia; Jeju, Korea, Nov. 5-9, 2007 (4 pages).
Office Action for Russian Application No. 2012101078/07 dated Nov. 21, 2012, with English translation thereof (8 pages).
International Search Report w/translation from PCT/JP2010/060620 dated Aug. 24, 2010 (4 pages).
3GPP TSG RAN WG1 Meeting #51bis, R1-080293; "UL DM RS for Multi-bandwidth Multi-user MIMO"; Nokia Siemens Networks, Nokia; Seville, Spain; Jan. 14-18, 2008 (3 pages).
3GPP TSG RAN WG1 #57, R1-091772; "Reference Signal structure for LTE-Advanced UL SU-MIMO"; San Francisco, USA; May 4-8, 2009 (6 pages).
3GPP TS 36.211 V8.7.0; "3rd Generation Partnership Project; Technical Specification Group Radio Access Network; Evolved Universal Terrestrial Radio Access (E-UTRA); Physical Channels and Modulation (Release 8)"; May 2009 (83 pages).

* cited by examiner

| CYCLIC SHIFT VALUE | START POINT |
|---|---|
| 000 | 0 |
| 001 | 2 |
| 010 | 3 |
| 011 | 4 |
| 100 | 6 |
| 101 | 8 |
| 110 | 9 |
| 111 | 10 |

FIG.3

| CYCLIC SHIFT VALUE | START POINT |
|---|---|
| 000 | 0 |
| 001 | 2 |
| 010 | 3 |
| 011 | 4 |
| 100 | 0 |
| 101 | 2 |
| 110 | 3 |
| 111 | 4 |

Rows 000–011: Comb #0
Rows 100–111: Comb #1

FIG.8

| ASSIGNMENT PATTERN 1 (COMMUNICATED ORTHOGONAL CODE IS {1, 1}) | |
| --- | --- |
| CYCLIC SHIFT VALUE | START POINT |
| 000 | 0 |
| 001 | 2 |
| 010 | 3 |
| 011 | 4 |
| 100 | 6 |
| 101 | 8 |
| 110 | 9 |
| 111 | 10 |

| ASSIGNMENT PATTERN 2 (COMMUNICATED ORTHOGONAL CODE IS {1, −1}) | |
| --- | --- |
| CYCLIC SHIFT VALUE | START POINT |
| 000 | 1 |
| 001 | 3 |
| 010 | 4 |
| 011 | 5 |
| 100 | 7 |
| 101 | 9 |
| 110 | 10 |
| 111 | 11 |

CS0, BS0 ARE COMMUNICATED
CS1 = (CS0 + 6)mod12
BS1 = BS0
CS2 = (CS0 + 3)mod12
BS2 = (BS0 + 1)mod2
CS3 = (CS0 + 9)mod12
BS3 = (BS0 +1)mod2

(b)

(c)

(d)

CS0, BS0 ARE COMMUNICATED
CS1 = (CS0 + 1)mod12
BS1 = (BS0 + 1)mod2
CS2 = (CS0 + 2)mod12
BS2 = BS0
CS3 = (CS0 + 3)mod12
BS3 = (BS0 +1)mod2

(a)

(b)

| CYCLIC SHIFT VALUE | START POINT | SPREADING CODE |
| --- | --- | --- |
| 000 | 0 | { 1 , 1 } |
| 001 | 2 | { 1 , 1 } |
| 010 | 3 | { 1 ,-1 } |
| 011 | 4 | { 1 , 1 } |
| 100 | 6 | { 1 , 1 } |
| 101 | 8 | { 1 , 1 } |
| 110 | 9 | { 1 ,-1 } |
| 111 | 10 | { 1 , 1 } |

FIG.13

MOBILE TERMINAL APPARATUS, RADIO BASE STATION APPARATUS AND COMMUNICATION CONTROL METHOD

TECHNICAL FIELD

The present invention relates to a mobile terminal apparatus that transmits uplink demodulation reference signals (RS), a radio base station apparatus and a communication control method.

BACKGROUND ART

In the LTE (Long Term Evolution) system, uplink data signals and uplink control signals are transmitted from a mobile terminal apparatus to a radio base station in a PUSCH (Physical Uplink Shared Channel) and PUCCH (Physical Uplink Control Channel). The uplink data signals and uplink control signals transmitted in the PUSCH and PUCCH are multiplexed with demodulation reference signals, which are used to perform channel estimation for synchronous detection in the radio base station.

In this case, between plural mobile terminal apparatus, common ZC sequences (Zadoff-Chu Sequences) are used as signal sequences of the uplink reference signals, and they are cyclically shifted in each mobile terminal apparatus. In cyclic shift, a last part of a predetermined sequence is added to the head thereby to generate a different signal sequence, and this is repeated to generate plural different signal sequences. Then, the ZC sequences are cyclically shifted in specific cyclic shift per mobile terminal apparatus so that reference signals from the plural mobile terminal apparatus are orthogonalized.

CITATION LIST

Non-Patent Literature

NPL1: 3GPP, TS 36.211, "Evolved Universal Terrestrial Radio Access (E-UTRA); Physical Channels and Modulation"

SUMMARY OF THE INVENTION

Technical Problem

Here, in the LTS system, in order to achieve higher transmission speed, the MIMO (Multiple Input Multiple Output) transmission using plural antennas has been adopted. In this MIMO transmission, different information pieces are transmitted from the transmission antennas with the same frequency at the same timing, thereby increasing the transmission speed. However, in the MIMO transmission, there is a problem of orthogonalizing of reference signals between plural antennas.

The present invention was carried out in view of the foregoing, and aims to provide a mobile terminal apparatus, a radio base station apparatus and a communication method capable of orthogonalizing uplink reference signals between plural antennas in the MIMO transmission.

Solution to Problem

An aspect of the present invention is a mobile terminal apparatus comprising: a reference signal generator configured to generate an uplink reference signal with use of a signal sequence which is orthogonalized by shifting a start point; a cyclic shift section configured to cyclically shift the uplink reference signal for each of antenna ports so that uplink reference signals corresponding to the antenna ports are orthogonalized between the antenna ports; and a transmitter configured to transmit the cyclically shifted uplink reference signal to a radio base station apparatus via the corresponding antenna port in an uplink.

According to this structure, the reference signals are signal sequences to be orthogonalized by shifting the respective start points. Accordingly, it is possible to orthogonalize the uplink reference signals between the plural antenna ports by cyclically shifting on each of the antenna ports and multiplex and transmit the signals to the radio base station apparatus.

Technical Advantage of the Invention

According to the present invention, it is possible to orthogonalize uplink reference signals between the plural antennas of the mobile terminal apparatus in the MIMO transmission.

BRIEF DESCRIPTION OF THE DRAWINGS

FIG. 3 is a view illustrating an example of a table in which cyclic shift values and cyclic shift start points are associated with each other according to the embodiment of the present invention;

FIG. 8 is a view of the embodiment of the present invention, illustrating an example of a table in which cyclic shift values and cyclic shift start points are associated with each other;

FIG. 10 is a view of the embodiment of the present invention, illustrating an example of selecting an assignment pattern of cyclic shift values based on an orthogonal code;

FIG. 13 is a view of the embodiment of the present invention, illustrating an example of a table in which cyclic shift values, cyclic shift start points and orthogonal codes are associated with each other.

DESCRIPTION OF EMBODIMENTS

Figure 1:
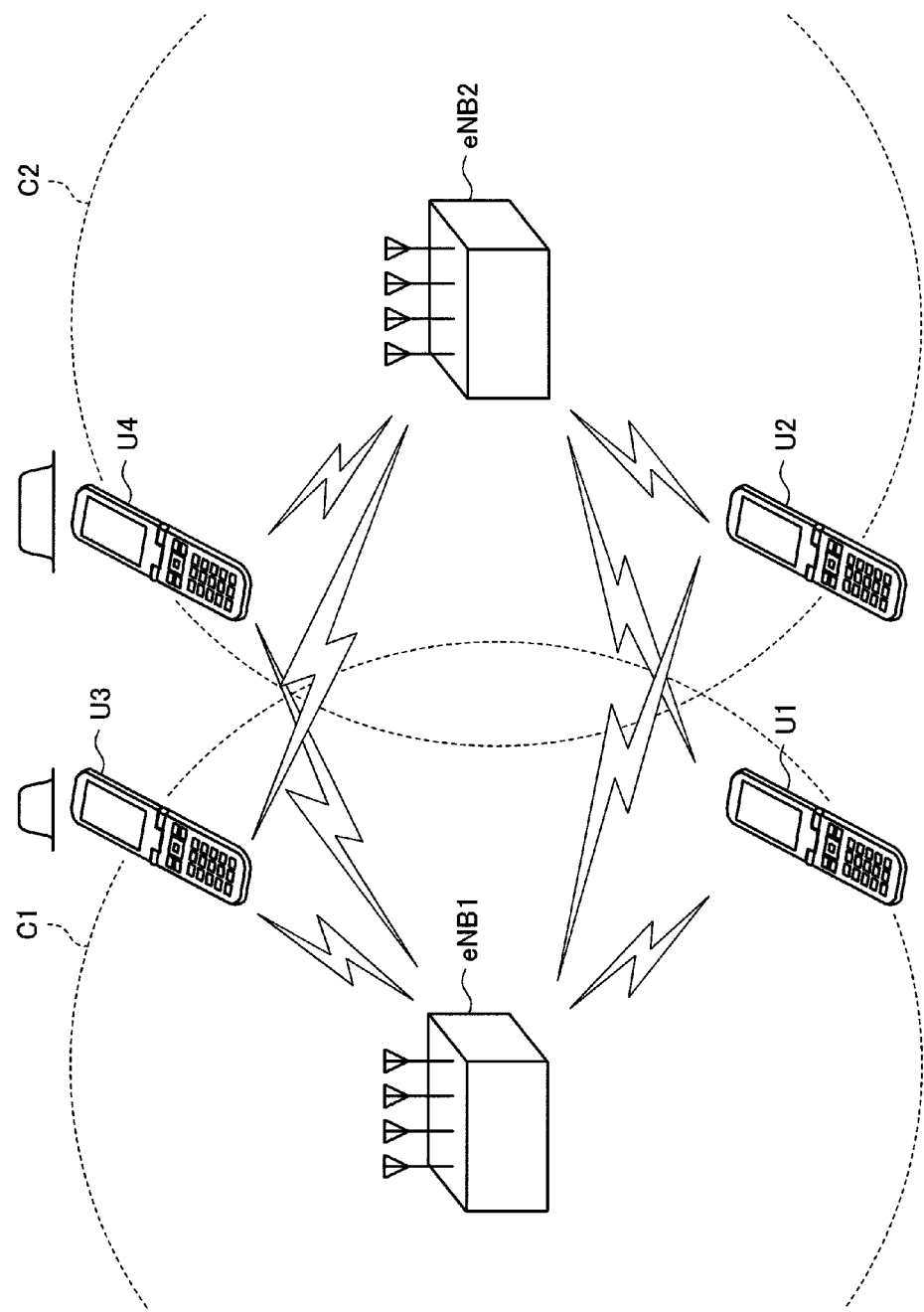
FIG. 1 is an explanatory view of an outline of transmission control of an uplink demodulation reference signal in a communication system according to an embodiment of the present invention.

With reference to the attached drawings, an embodiment of the present invention will be described in detail below. Here, in this embodiment, description is made about orthogonalizing of demodulation reference signals (DM-RS), however, the demodulation reference signals are not intended for limiting the present invention, and any signals that are orthogonalized between users or antenna ports in the uplink, for example, reference signals for CQI measurement (Sounding Reference Signals), may be adopted instead. FIG. 1 is an explanatory view of an outline of transmission control of uplink demodulation reference signals in a communication system according to the embodiment of the present invention.

In the communication system illustrated in FIG. 1, each of a plurality of mobile terminal apparatus U1, U2, U3 and U4 has a plurality of antennas and is configured to be able to communicate with a radio base station apparatus eNB1 covering a cell C1 and a radio base station apparatus eBN2 covering a cell C2. In the uplink, uplink data signals and uplink control signals are transmitted from the mobile terminal apparatus U1, U2, U3 and U4 to the radio base station apparatus eNB1 and eNB2 in uplink communication channels.

An uplink data signal and an uplink control signal to be transmitted in an uplink communication channel are time-multiplexed with a demodulation reference signal. The radio base station apparatus eNB1 and eNB2 estimation channel based on received demodulation reference signals for synchronous detect ion of uplink communication channels In this case, a demodulation reference signal uses, as a signal sequence, a ZC sequence that is common in one cell. ZC sequences are sequences that are orthogonalized on the condition that the amplitude is fixed over a frequency band, auto-correlation is zero except at a synchronous point and the start point of the signal sequence is shifted. In this communication system, demodulation reference signals are orthogonalized between antennas of the mobile terminal apparatus U1, U2, U3 and U4 by cyclically shifting the demodulation reference signals of the ZC-sequence on an antenna port basis.

Here, the common ZC sequences cannot be used unless serving cells and transmission bands are shared in plural users. Accordingly, if serving cells are different like the mobile terminal apparatus U1, U2 or if transmission bands are different like the mobile terminal apparatus U3, U4, the demodulation reference signals between plural users cannot be orthogonalized only by cyclically shifting the signals on each of antenna ports of the mobile terminal apparatus.

Particularly, in a succeeding system to LTE, that is, the LTE-A (LTE advanced), consideration is given to introduction of SU-MIMO (Single-User Multiple-Input Multiple-Output), MU-MIMO (Multi-User Multiple-Input Multiple-Output), CoMP and the like, and it is expected that signals are orthogonalized not only between antennas of one user but also between users. Then, in this system, the demodulation reference signals are orthogonalized between users using distributed FDMA (Frequency Division Multiple Access) and block spreading in addition to cyclic shifting.

Here, this embodiment is described by way of example of a ZC sequence as a signal sequence of an uplink demodulation reference signal, but not limited to this signal sequence. Any signal sequence may be used as far as the demodulation reference signals are orthogonalized by shifting a start point of the signal sequence.

Figure 2:
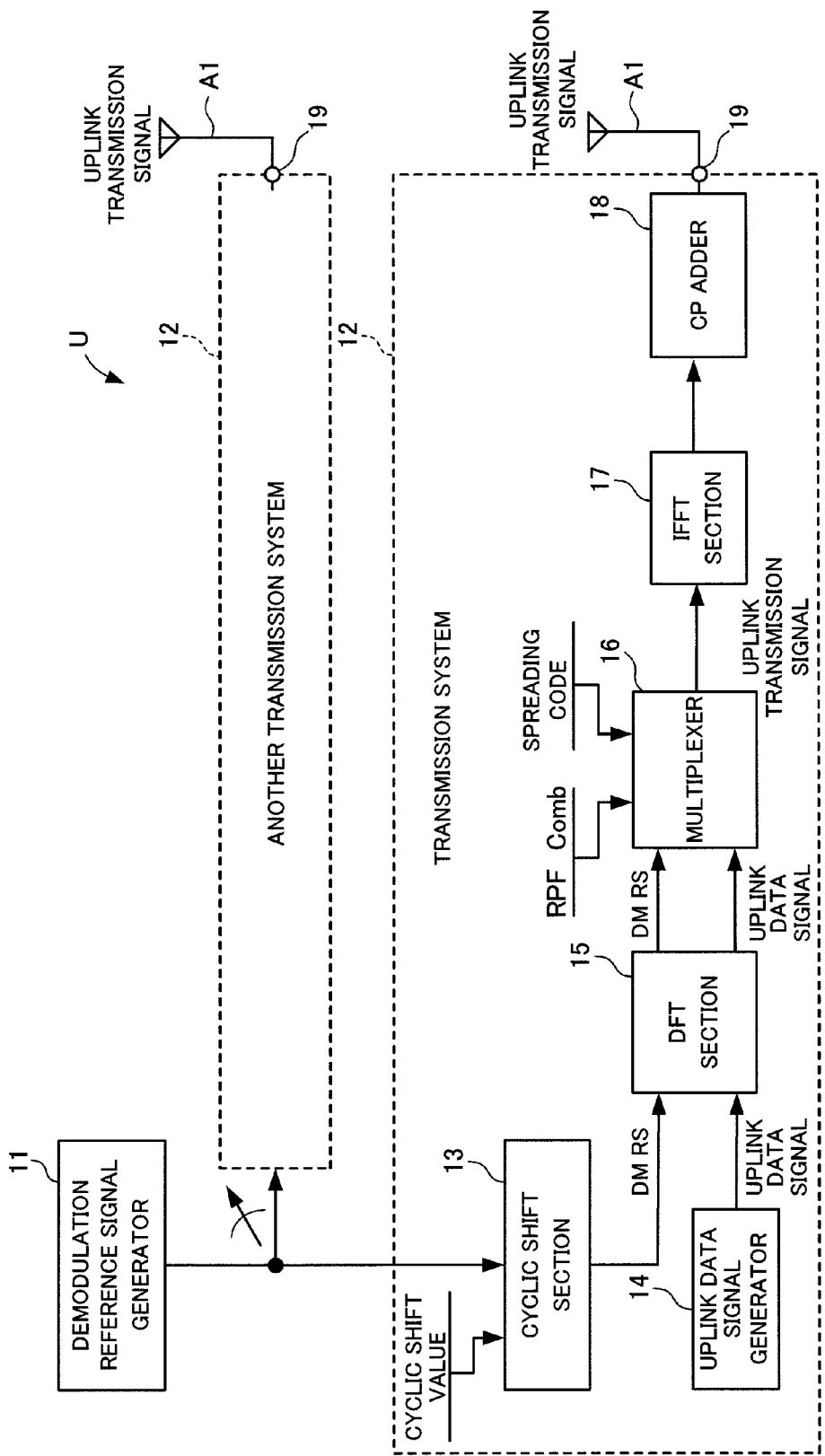
FIG. 2 is a functional block diagram of a mobile terminal apparatus according to the embodiment of the present invention.

The following description is made in detail, with reference to FIGS. 2 to 8, about the functional structures of the mobile terminal apparatus and the radio base station apparatus. First, FIG. 2 is referred to for explanation of the functional structure of a mobile terminal apparatus. FIG. 2 is a functional block diagram of the mobile terminal apparatus according to the embodiment of the present invention. Here, the mobile terminal apparatus according to the present invention has a plurality of transmission systems, however, in FIG. 2, only one transmission system is illustrated concretely, for convenience of explanation.

As illustrated in FIG. 2, each mobile terminal apparatus U has a demodulation reference signal generator 11, and a plurality of transmission systems 12 corresponding to respective transmission antennas A. Each transmission system 12 has a cyclic shift section 13, an uplink data signal generator 14, a DFT (Discrete Fourier Transform) section 15, a multiplexer 16, an IFFT (Inverse Fast Fourier Transform) section 17, and a CP (cyclic Prefix) adder 18.

The demodulation reference signal generator 11 generates a demodulation reference signal. The demodulation reference signal is generated from the above-mentioned ZC sequence as a signal sequence, and used to measure a state of a radio transmission channel for demodulation by synchronous detection in the radio base station apparatus eNB. The demodulation reference signal generated by the demodulation reference signal generator 11 is transmitted to a output system 12 corresponding to each antenna port 19.

The cyclic shift section 13 receives a signal sequence of the demodulation reference signal input from the demodulation reference signal generator 11 and cyclically shifts the signal sequence based on a cyclic shift value notified from the radio base station apparatus eNB. Cyclic shift is shifting of a signal sequence of a demodulation reference signal by taking a part of the signal sequence from the cyclic shift start point indicated by the cyclic shift value to the last and adding the part of the signal sequence to the head. With this cyclic shifting, signal sequences of demodulation reference signal which are different from antenna ports 19 of other transmission systems 12 are generated.

Specifically, as illustrated in FIG. 3, the mobile terminal apparatus U has a table in which cyclic shift values are associated with cyclic shift start points. A cyclic shift value is, for example, a three-bit signal and is configured to be able to specify each of eight cyclic shift start points in total. Then, the cyclic shift section 13 starts cyclic shifting at the cyclic shift start point corresponding to the cyclic shift value notified from the radio base station apparatus eNB.

Figure 4:
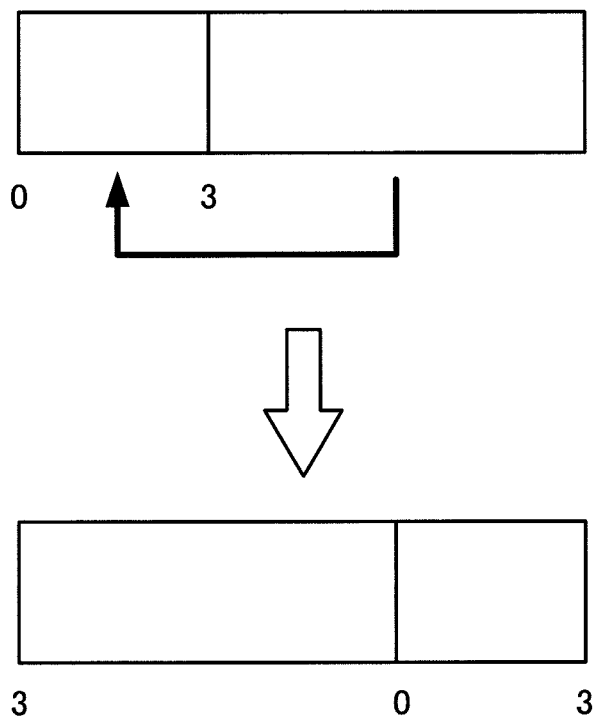
FIG. 4 is a view illustrating cyclic shifting according to the embodiment of the present invention.

For example, when the cyclic shift value is "010", the cyclic shift start point is "3" and as illustrated in FIG. 4, apart of signal sequence of the demodulation reference signal from the cyclic shift start point "3" to the last is shifted to the head. In the same way, in an antenna port 19 of another transmission system 12, a part of signal sequence of a demodulation reference signal is shifted by another cyclic shift value.

In this way, the demodulation reference signal having ZC sequences are cyclically shifted thereby to be orthogonalized between antenna ports 19. The cyclically shifted demodulation reference signals are output to the DFT section 15. Here, a method of notifying the cyclic shift value from the radio base station apparatus eNB to the mobile terminal apparatus U will be described later.

The uplink data signal generator 14 generates an uplink data signal containing user data and the like with use of data received from a higher layer. Then, it adds an error correction code to the uplink data signal and modulates per subcarrier. The generated uplink data signal is output to the DFT section 15.

The DFT section 15 receives the demodulation reference signal and uplink data signal input from the cyclic shift section 13 and the uplink data signal generator 14 and performs Discrete Fourier Transform processing on the demodulation reference signal and uplink data signal. The demodulation reference signal and the uplink data signal are transformed into time-domain signals to frequency-domain signals by the DFT processing and output to the multiplexer 16.

The multiplexer 16 multiplexes the demodulation reference signal to the uplink data signal and outputs an uplink transmission signal to the IFFT section 17. The demodulation reference signal is multiplexed, for example, to the third symbol and the tenth symbol in one subframe (see FIGS. 5 and 6). Besides, when multiplexing demodulation reference signals, the multiplexer 16 orthogonalizes the demodulation reference signals in different users by distributed FDMA or block spreading.

Figure 5:
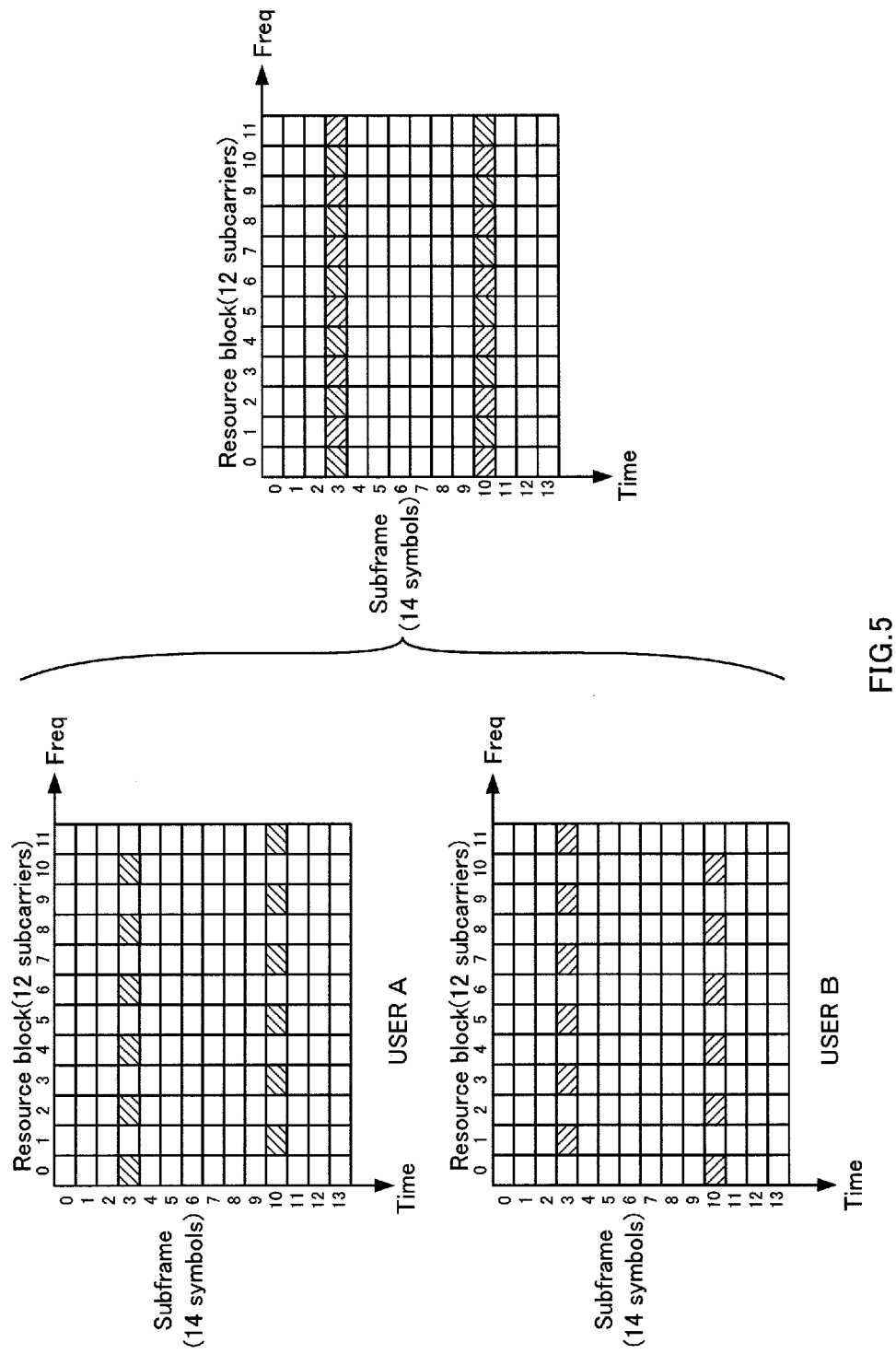
FIG. 5 is a view of the embodiment of the present invention, illustrating an example of distributed FDMA.

In the distributed FDMA, in the symbols to which the demodulation reference signals are multiplexed, subcarriers that form a resource block are assigned to plural users in accordance with a fixed set of rules based on the assignment information notified from the radio base station apparatus eNB. As illustrated in FIG. 5, when multiplexing is performed between two users, demodulation reference signals are multiplexed to every other subcarrier in symbols. In this case, the user A (for example, mobile terminal apparatus U1) is assigned even-number-th subcarriers in the third symbol and the user B (for example, mobile terminal apparatus U2) is assigned odd-number-th subcarriers in the third symbol.

In this way, as the subcarriers are divided between plural users, the demodulation reference signals are orthogonalized between users. In FIG. 5, a resource block is divided into two users so that demodulation reference signals are orthogonalized, which structure is not intended for limiting the present invention. Subcarriers assigned to plural users don't have only to overlap and for example, if demodulation reference signals are orthogonalized between three users, the demodulation reference signals have only to be multiplexed at intervals of two subcarriers and subcarriers are assigned to the users in a fixed order. Here, a method of notifying assignment information from the radio base station apparatus eNB to the mobile terminal apparatus U will be described later.

Besides, the distributed FDMA may be replaced with block spreading to orthogonalize demodulation reference signals between plural users. In block spreading, each demodulation reference signal is multiplied by a spreading code notified from the radio base station apparatus eNB thereby to spread the signal in the frequency direction. In this case, the spreading code is an orthogonal code and demodulation reference signals of plural users may be multiplexed to the same symbol.

Figure 6:
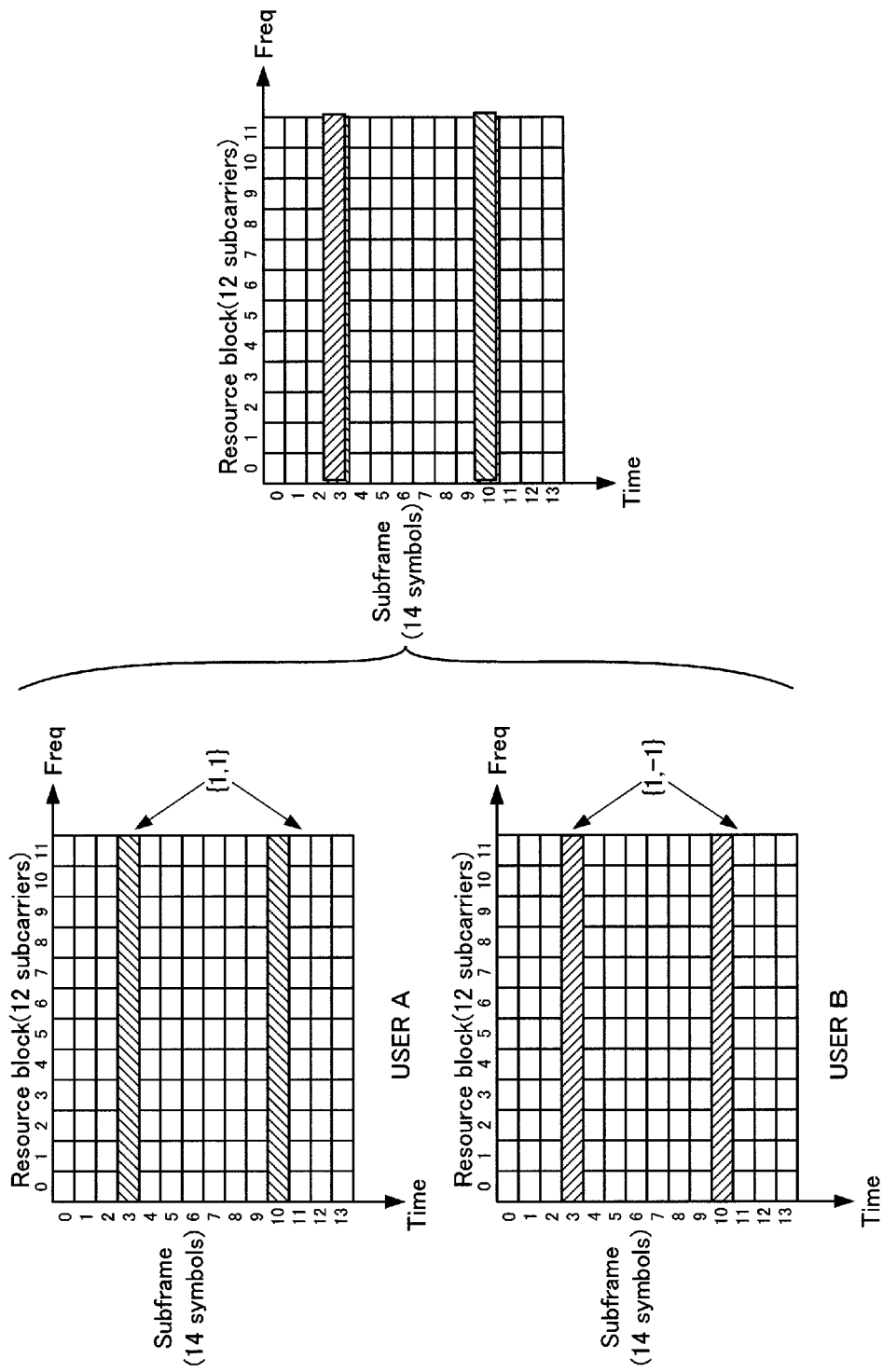
FIG. 6 is a view of the embodiment of the present invention, illustrating an example of block spreading.

As illustrated in FIG. 6, when demodulation reference signals are multiplexed between two users, a reference signal of the user A (for example, a mobile terminal apparatus U1) is multiplied by the orthogonal code {1, 1} and a reference signal of the user B (for example, a mobile terminal apparatus U2) is multiplied by the orthogonal code {1, −1}. In this way, the demodulation reference signals are multiplied by orthogonal codes thereby to be able to prevent interference of the demodulation reference signals of plural users in the same frequency band.

Here, in FIG. 6, it is assumed that the demodulation reference signals are orthogonalized in two users, however, this is not intended for limiting the present invention. The demodulation reference signals may be orthogonalized in the same symbols between plural users and, for example, if the demodulation reference signals may be orthogonalized between four users, four-chip orthogonal code may be used.

In this way, in the multiplexer 16, it is possible to orthogonalize demodulation reference signals in plural mobile terminal apparatus U having different serving cells and transmission bands by distributed FDMA or block spreading.

The IFFT section 17 receives a multiplexed uplink transmission signal input from the multiplexer 16 and performs Inverse Fast Fourier Transform on the uplink transmission signal. The uplink transmission signal is transformed from a frequency-domain signal to a time-domain signal by the Inverse Fast Fourier Transform processing and output to a CP adder 18.

The CP adder 18 adds a cyclic prefix to the uplink transmission signal input from the IFFT section 17. The Uplink transmission signal added the cyclic prefix is transmitted via a transmission antenna A1 toward the radio base station apparatus eNB. In this case, user data contained in the uplink transmission signal is transmitted in the PUSCH or the like and a control signal contained in the uplink transmission signal is transmitted in the PUCCH or the like.

Figure 7:
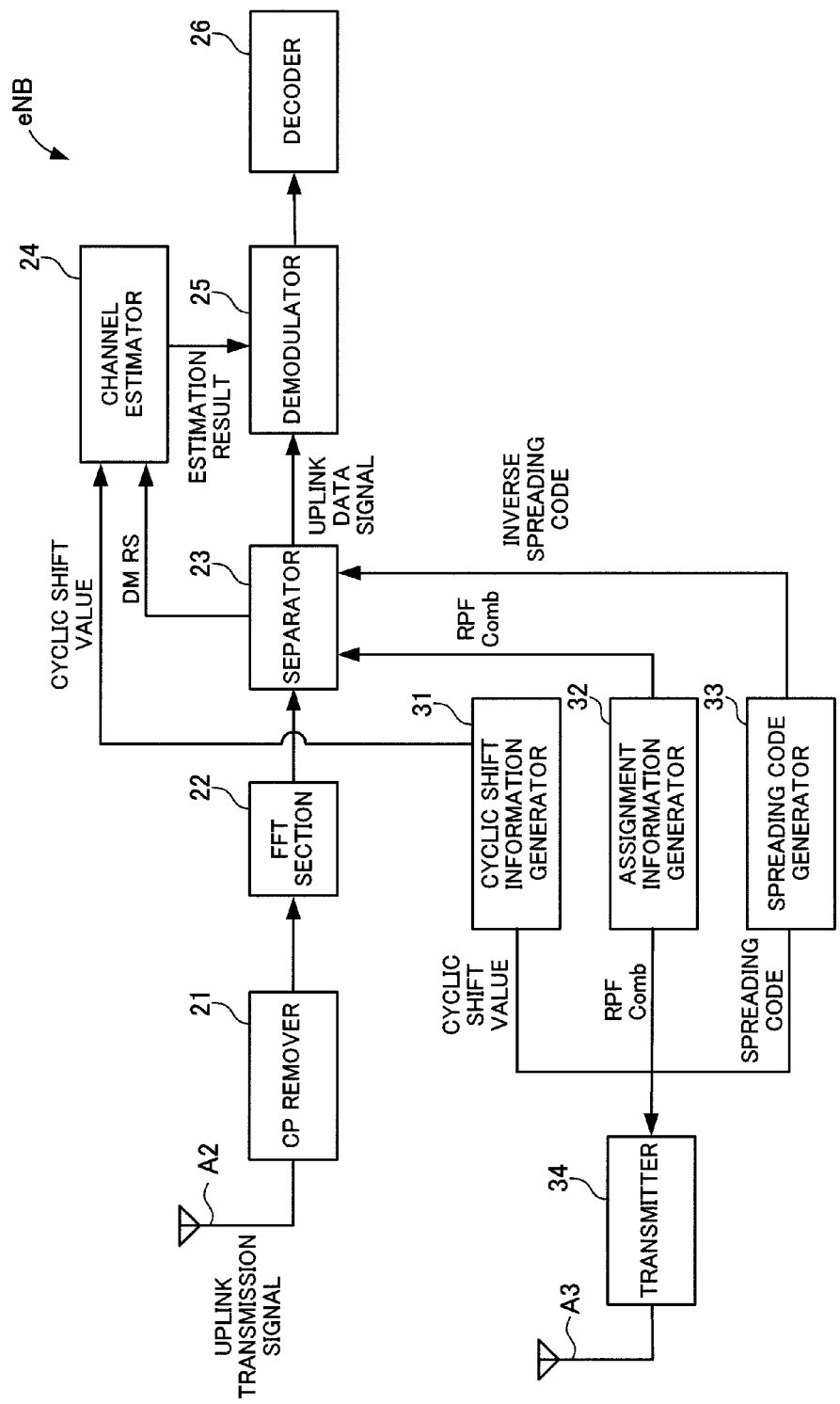
FIG. 7 is a functional block diagram of a radio base station apparatus according to the embodiment of the present invention.

Next description is made, with reference to FIG. 7, about a functional structure of the radio base station apparatus. FIG. 7 is a functional block diagram of the radio base station apparatus according to the embodiment of the present invention. Here, the radio base station apparatus according to this embodiment has a plurality of reception systems, however, for convenience of explanation, only one of them is illustrated in FIG. 7.

As illustrated in FIG. 7, the radio base station apparatus eNB has, as the reception system, a CP remover 21, an FFT (Fast Fourier Transform) section 22, a separator 23, a channel estimator 24, a demodulator 25 and a decoder 26. In addition, the radio base station apparatus eNB has a cyclic shift information generator 31, an assignment information generator 32, a spreading code generator 33 and a transmitter 34.

The CP remover 32 removes a cyclic prefix from the uplink transmission signal received by the reception antenna A2. The uplink transmission signal removed the cyclic prefix is output to the FFT section 22. The FFT section 22 performs Fast Fourier Transform processing on the uplink transmission signal removed the cyclic prefix input from the CP remover 21. The uplink transmission signal is transformed from a time domain signal to a frequency domain signal by the FFT processing and output to the separator 23.

The separator 23 takes a demodulation reference signal and an uplink data signal from the uplink transmission signal and separates into the uplink data signal and the demodulation reference signal. At this time, if the demodulation reference signal is user-multiplexed by distributed FDMA, the separator 23 obtains assignment information from the assignment information generator 32 and takes a demodulation reference signal out based on the assignment information. The obtained demodulation reference signal is output to the channel estimator 24 and the uplink data signal is output to, the demodulator 25.

On the other hand, when the demodulation reference signal is user-multiplexed by block spreading, the separator 23 obtains an inverse spreading code from the spreading code generator 33 and multiplies the multiplexed demodulation reference signal multiplexed with other user by the inverse spreading code thereby to take the self-addressed demodulation reference signal. The demodulation reference signal is output to the channel estimator 24 and the uplink data signal is output to the demodulator 25.

The channel estimator 24 estimates the channel based on the input demodulation reference signal as a basis to estimate the channel. Then, the channel estimator 24 obtains the ZC sequence of the mobile terminal apparatus U and the cyclic shift value from the cyclic shift information generator 31 to detect a shift amount per antenna based on the cyclic shift start point indicated by the cyclic shift value. With this processing, the channel estimator 24 obtains a channel estimation result of each antenna port 19.

The demodulator 25 uses the uplink data signal input from the separator 23 and the channel estimation result input from the channel estimator 24 as a basis to demodulate the uplink data signal. The uplink data signal demodulated by the demodulator 25 is subjected to channel equalization and Inverse Discrete Fourier Transform and then, input to the decoder 26. The decoder 26 removes an error correction code from the uplink data signal and takes out user data and the like.

The cyclic shift information generator 31 generates a cyclic shift value per antenna port 19 of the mobile terminal apparatus U and communicates it to the mobile terminal apparatus U via the transmitter 34 in the downlink. The cyclic shift value is a signal that represents the cyclic shift start point and the antenna ports have different cyclic shift values. For example, the radio base station apparatus eNB communicates the different cyclic shift values to the mobile terminal apparatus U that has four antenna ports in such a manner that the cyclic shift value of the antenna port #0 is "000", the cyclic shift value of the antenna port #1 is "010", the cyclic shift value of the antenna port #2 is "100" and the cyclic shift value of the antenna port #3 is "110".

With this structure, as illustrated in FIG. 3, the cyclic shift start points of the antenna ports #0, #1, #2, #3 of the mobile terminal apparatus U are set to "0", "3", "6", "9". In this way, the cyclic shift information generator 31 generates a three-bit cyclic shift value for each antenna port 19, which is totally twelve-bit cyclic shift values, and communicates them to the mobile terminal apparatus U, thereby making it possible to orthogonalize demodulation reference signals in the four antenna ports 19. Here, it is assumed that the cyclic shift value is of three bits, however, this is not intended for limiting the present invention. The size of control bits may vary in accordance of the number of choices of the cyclic shift start point.

Besides, the structure of communicating the cyclic shift value of each antenna port 19 from the cyclic shift information generator 31 to the mobile terminal apparatus U may be replaced with the structure of communicating the cyclic shift value as a reference of an antenna port 19 and difference values between cyclic shift values of antenna ports 19 set equally separated from each other. In this case, the cyclic shift information generator 31 generates the cyclic shift value of the reference antenna port 19 and the difference value between the cyclic shift value of each antenna port 19.

For example, the radio base station apparatus eNB communicates, to the mobile terminal apparatus U having four antenna ports, a three-bit cyclic shift value "000" of the reference antenna port #0 and a two-bit different value "10", which are totally five-bit information. Then, the difference value of the cyclic shift value between the antenna ports 19 of the mobile terminal apparatus U becomes "2" and as illustrated in FIG. 3, the cyclic shift start points of the antenna ports #0, #1, #2, #3 are set to "0", "3", "6" and "9".

In this way, as the reference cyclic shift value and the difference value, for example, the three-bit cyclic value and the two-bit difference value, which are totally five bits, are communicated to the mobile terminal apparatus U, it is possible to prevent increase in size of control bits in proportion to the number of antenna ports and to reduce the size of control bits. Here, it is assumed in description that the cyclic shift value is of three bits and the difference value is of two bits, however, this is not intended for limiting the present invention. The size of control bits may vary in accordance with the number of choices of the cyclic shift start point and the size of the different value.

Further, the above-described structure may be replaced with the structure where a plurality of assignment patterns of cyclic shift values is preset for the mobile terminal apparatus U and the radio base station apparatus eNB and the selecting information of assignment patterns is notified from the radio base station apparatus eNB. In this case, the cyclic shift information generator 31 generates selecting information of the assignment pattern. The selecting information is information for selecting one from the plural assignment patterns provided in the mobile terminal apparatus U.

When mobile terminal apparatus U have two assignment patterns, that is, the first and second assignment patterns, one-bit selecting information is notified from the radio base station apparatus eNB to the mobile terminal apparatus U. For example, in the case of the selecting information "0", the first assignment pattern is selected to assign the cyclic shift start points "0", "2", "3", "4" to the antenna ports #0, #1, #2, #3. And, in the selecting information "1", the second assignment pattern is selected to assign the cyclic shift start points "0", "3", "6", "9" to the antenna ports #0, #1, #2, #3.

In this way, as the selecting information of the assignment pattern is only notified, it becomes possible to further reduce the size of control bits. Here, it is assumed that the selecting information is one bit, however, this is not intended for limiting the present invention. The size of control bits may vary in accordance with the kinds of assignment patterns.

Further, the structure of communicating the selecting information of the assignment pattern may be replaced with the structure in which an assignment pattern (table) is selected in accordance with the spreading code communicated from the radio base station apparatus eNB. For example, as illustrated in FIG. 10, when the orthogonal code {1, 1} is communicated from the radio base station apparatus eNB, the assignment pattern 1 is selected and when the orthogonal code {1, −1} is communicated from the radio base station apparatus eNB, the assignment pattern 2 is selected. In this case, the cyclic shift values of the assignment patterns and the antenna ports may be associated with each other in advance or they may be associated in accordance with the cyclic shift values communication from the radio base station apparatus eNB. With this structure, it is possible to reduce the size of control bits without communicating the selecting information separately from the orthogonal codes from the radio base station apparatus eNB to the mobile terminal apparatus U.

Furthermore, when the assignment pattern is selected in accordance with the spreading code notified from the radio base station apparatus eNB, the cyclic shift start point of each antenna port 19 may be set based on the cyclic shift value of the reference antenna port notified with the spreading code from the radio base station apparatus eNB. In this case, the mobile terminal apparatus U has a setting condition of setting the cyclic shift start point for each antenna port 19 based on the reference cyclic shift value and the spreading code in addition to the plural kinds of assignment patterns in accordance with the spreading codes.

The setting condition used here means a calculation equation for setting the cyclic shift start point of each antenna port based on the reference cyclic shift value and the spreading code notified from the radio base station apparatus eNB. That is, the mobile terminal apparatus U calculates the cyclic shift start point of each antenna port automatically based on the setting condition by receiving the spreading code and the reference cyclic shift value from the radio base station apparatus eNB. Thus, in this structure, it is possible to reduce the size of control bits as the radio base station apparatus eNB notifies combination of the block spreading code used in the above-described block spreading and the reference cyclic shift value.

Figure 11:
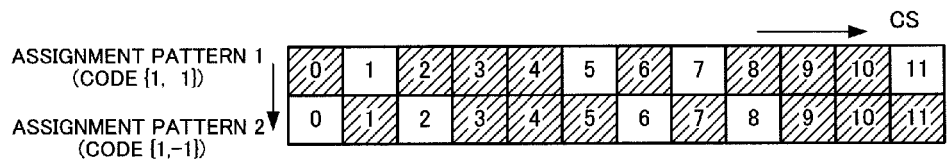
FIG. 11 is a view of the embodiment of the present invention, illustrating an example of an assignment pattern of cyclic shift values and setting condition set for the mobile terminal apparatus.
Figure 11:
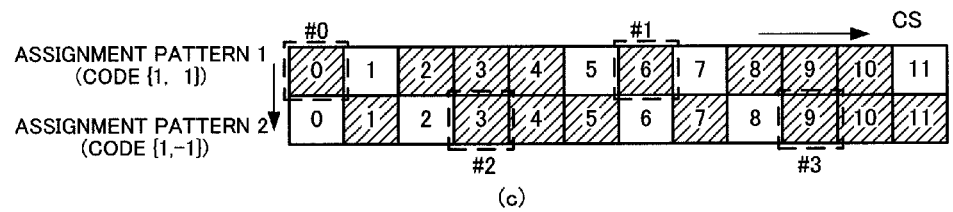
Figure 11:
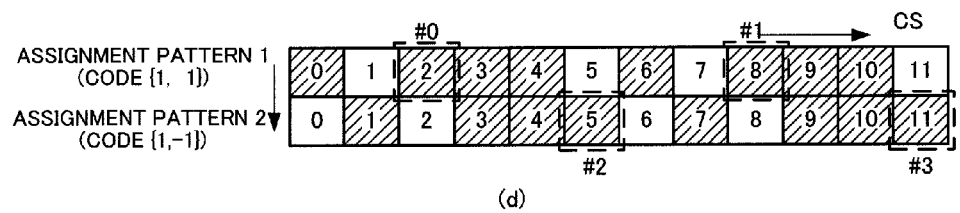

For example, as illustrated in FIG. 11(a), the mobile terminal apparatus U has two assignment patterns of the assignment pattern 1 and the assignment pattern 2 corresponding to the orthogonal codes {1, 1} and {1, −1} notified from the radio base station apparatus eNB as the spreading code. Here, the assignment pattern illustrated in FIG. 11(a) is representing the assignment pattern illustrated in FIG. 10 by a two-dimensional manner in which the vertical direction shows assignment of orthogonal codes and the lateral direction shows assignment of cyclic shift values. Besides, the resources hatched in FIG. 11(a) are resources that can be assigned in fact to the antenna ports #0, #1, #2, #3. Each resource corresponds to the cyclic shift start point shown in FIG. 10.

Accordingly, in the assignment pattern 1, as shown by hatched part, the cyclic shift start points indicated by resources other than the resources "1", "5", "7", "11" can be assigned to the antenna ports #0, #1, #2, #3. On the other hand, in the assignment pattern 2, as shown by hatched part, the cyclic shift start points indicated by resources other than the resources "0", "2", "6", "8" offset by one from those in the assignment pattern 1 can be assigned to the antenna ports #0, #1, #2, #3.

As illustrated in FIG. 11(b), the mobile terminal apparatus has a setting condition for setting the cyclic shift start points of the remaining antenna ports #1, #2, #3 with the antenna port #0 as a reference. The cyclic shift value (CS1) of the antenna port #1 is set as six resources shifted in the lateral direction from the cyclic shift value (CS0) of the reference antenna port #0. At this time, the assignment pattern set to the antenna port #1 is selected in accordance with the spreading code notified from the radio base station apparatus eNB.

In the antenna port #1, the spreading code notified from the radio base station apparatus eNB is used as the spreading code (BS1) used in selection of the assignment pattern, like the spreading code (BS0) used in selecting of the assignment pattern in the antenna port #0. Accordingly, the antenna port #1 has a setting of the same assignment pattern as the antenna port #0. Here, the spreading code is notified by one bit such as "0" or "1", and for example, "0" represents the orthogonal code {1, 1} and "1" represents the orthogonal code {1, −1}.

The cyclic shift value (CS2) of the antenna port #2 is set as three resources shifted in the lateral direction from the cyclic shift value (CS0) of the antenna port #0. At this time, in the antenna port #2, the spreading code one resource shifted in the vertical direction from the spreading code (BS0) used in selection of the assignment pattern of the antenna port #0 is used as the spreading code (BS2) used in selection of the assignment pattern. In the example illustrated in FIG. 11(b), in the spreading code (BS2), the code is inverted by one resource shifting in the vertical direction from the spreading code (BS0). Accordingly, in the antenna port #2, an assignment pattern different from the assignment patterns of the antenna ports #0, #1 is selected.

The cyclic shift value (CS3) of the antenna port #3 is set as nine resources shifted in the lateral direction from the cyclic shift value (CS0) of the antenna port #0. At this time, in the antenna port #3, the spreading code one resource shifted in the vertical direction from the spreading code (BS0) used in selection of the assignment pattern of the antenna port #0 is used as the spreading code (BS3) used in selection of the assignment pattern. Accordingly, in the antenna port #3, an assignment pattern different from the assignment patterns of the antenna ports #0, #1 is selected.

When the mobile terminal apparatus U having such assignment patterns and setting conditions is notified with "0" that represents the orthogonal code {1, 1} as the spreading code and "000" that represents the reference cyclic shift value "0", as illustrated in FIG. 11(c), the cyclic shift start points are set in the respective antenna ports #0, #1, #2, #3. The assignment pattern 1 corresponding to the orthogonal code {1, 1} is selected for the antenna ports #0, #1 and resources "0" and "6" of the assignment pattern 1 are assigned respectively. The assignment pattern 2 corresponding to the orthogonal code {1, −1} is selected for the antenna ports #2, #3 and resources "3" and "9" of the assignment pattern 2 are assigned respectively. Accordingly, the cyclic shift start points of the antenna ports #0, #1, #2, #3 are set to "0", "6", "3", "9", respectively.

Further, when the mobile terminal apparatus U having the above-described assignment patterns and setting conditions is notified with "0" that represents the orthogonal code {1, 1} as the spreading code and "001" that represents the reference cyclic shift value "2", as illustrated in FIG. 11(d), the cyclic shift start points are set in the respective antenna ports #0, #1, #2, #3. The assignment pattern 1 corresponding to the orthogonal code {1, 1} is selected for the antenna ports #0, #1 and resources "2" and "8" of the assignment pattern 1 are assigned respectively. The assignment pattern 2 corresponding to the orthogonal code {1, −1} is selected for the antenna ports #2, #3 and resources "5" and "11" of the assignment pattern 2 are assigned respectively. Accordingly, the cyclic shift start points of the antenna respectively.

Figure 12:
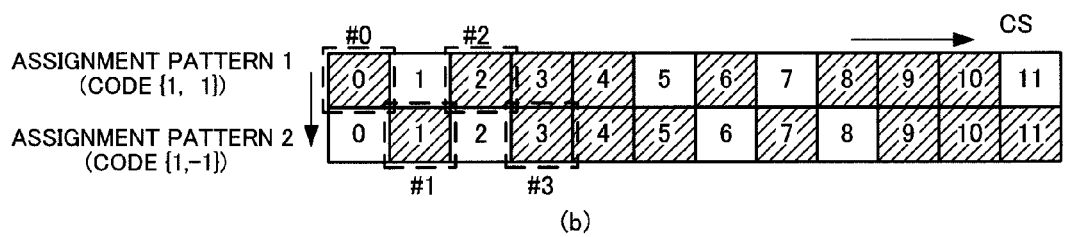
FIG. 12 is a view of the embodiment of the present invention, illustrating another example of an assignment pattern of cyclic shift values and setting condition set for the mobile terminal apparatus.

Here, the setting condition is not limited to the above-described condition and may be such as illustrated in FIG. 12(a), for example. In this setting condition, the cyclic shift values (CS1, CS2, CS3) of the antenna ports #1, #2, #3 are set as shifted in the lateral direction from the cyclic value (CS0) of the antenna port #0, by one resource, two resources, three resources, respectively. Besides, the assignment patterns of the antenna ports #0, #1, #2, #3 may set to be different from each other.

Here, when the mobile terminal apparatus U having this setting condition is notified with "0" indicating the orthogonal code {1, 1} as the spreading code and "000" indicating the reference cyclic shift value "0" as illustrated in FIG. 12(b), the cyclic shift start points are set for the antenna ports #0, #1, #2, #3. The assignment pattern 1 corresponding to the orthogonal code {1, 1} is selected for the antenna ports #0, #2, which are assigned resources and "2" of the assignment pattern 1, respectively. The assignment pattern 2 corresponding to the orthogonal code {1, −1} is selected for the antenna ports #1, #3, which are assigned resources "1" and "3" of the assignment pattern 2, respectively. Accordingly, the cyclic shift start points of the antenna ports #0, #1, #2, #3 are set to "0", "1", "2", "3", respectively.

In this way, as the four-bit information containing one-bit orthogonal code and three-bit cyclic shift value as a reference is communicated to the mobile terminal apparatus U, it becomes possible to prevent the control bits from increasing in proportion to the number of antenna ports and to reduce the control bit number. Here, it is assumed that the cyclic shift value is of three bits and the orthogonal code is of one bit, however, this is not intended for limiting the present invention. The size of bits may vary in accordance with the number of choices of the cyclic shift start point and the number of assignment patterns. Besides, also in this structure, there is no need to communicate the selecting information for selecting the assignment pattern separately from the orthogonal code.

Here, in the above-described structure, it is assumed that the cyclic shift start point is set over plural assignment patterns. However, the cyclic shift start point may be set by a single assignment pattern. Further, it is assumed that there are two assignment patterns, however, three or more assignment patterns may be used in accordance with the number of codes of the spreading code.

Besides, it is assumed in the description that the mobile terminal apparatus U has a single setting condition, however this is not intended for limiting the present invention. The mobile terminal apparatus U may have plural setting conditions and the radio base station apparatus eNB may communicate setting selecting information of the setting condition. In this case, the cyclic shift information generator 31 generates the setting selecting information of the setting condition. The setting selecting information is information for selecting one setting condition from the plural setting conditions.

When the mobile terminal apparatus U has two setting conditions, the radio base station apparatus eNB notifies the mobile terminal apparatus U of one-bit setting selecting information. For example, when the setting selecting information is "0", the setting condition illustrated in FIG. 11(*b*) is selected and when the setting selecting information is "1", the setting condition illustrated in FIG. 12(*a*) is selected. In this way, as the setting selecting information of the setting condition is notified in addition to the spreading code and the cyclic shift value as a reference, it is possible to set the cyclic shift start points of the antenna ports #0, #1, #2, #3, more freely. Here, it is assumed that the setting selection information is of one bit, however, this is not intended for limiting the present invention. The size of control bits may vary in accordance with the number of conditions of the setting condition.

Further, instead of the above-described structure, a specific assignment pattern may be set in advance for the mobile terminal apparatus U. In this case, the radio base station apparatus eNB does not have the cyclic shift information generator 31. With this structure, it is possible to orthogonalize demodulation reference signals between plural antenna ports 19 of the mobile terminal apparatus U without communicating the cyclic shift value from the radio base station apparatus eNB to the mobile terminal apparatus U.

Besides, the cyclic shift start point and spreading code for each antenna port 19 may be set based on the cyclic shift value notified from the radio base station apparatus eNB. In this case, the mobile terminal apparatus U further associates the spreading code with the table where the cyclic shift value is associated with the cyclic shift start point, as illustrated in FIG. 13. In the table illustrated in FIG. 13, the spreading code {1, 1} is associated other than the cyclic shift values "010", "110", and the spreading code {1, −1} is associated with the cyclic shift values "010", "110".

For example, the radio base station apparatus eNB notifies the mobile terminal apparatus U of the cyclic shift value "000" of the antenna port #0, the cyclic shift value "010" of the antenna port #1, the cyclic shift value "100" of the antenna port #2 and the cyclic shift value "110" of the antenna port #3. With this notification, the cyclic shift start points of the antenna ports #0, #1, #2, #3 of the mobile terminal apparatus U are set to "0", "3", "6", "9" and the antenna ports #0 and #2 are set with the spreading code {1, 1} and the antenna ports #1 and #3 are set with the spreading code {1, −1}.

With this structure, as the cyclic shift start point and the spreading code can be identified at the mobile terminal apparatus U in accordance with the cyclic shift value communicated from the radio base station apparatus eNB, there is no need to communicate the spreading code from the radio base station apparatus eNB to the mobile terminal apparatus U, thereby allowing reduction of the size of control bits for the spreading code. Here, it is assumed that the cyclic shift value is of three bits, however, this is not intended for limiting the present invention. The size of control bits may vary in accordance with the number of choices of the cyclic shift start point.

Besides, as to the structure of setting the cyclic shift start point and the spreading code for each antenna port 19 in accordance with the cyclic shift value communicated from the radio base station apparatus eNB, it is not limited to the structure of communicating the cyclic shift value for each antenna port 19. The radio base station apparatus eNB may be configured to communicate the cyclic shift value of the antenna port 19 as a reference mentioned above and a difference value of the cyclic shift value set at even intervals for each antenna port 19. In this case, the cyclic shift information generator 31 generates the cyclic shift value of the antenna port 19 as a reference and a difference value of the cyclic shift value between each antenna port 19.

For example, the radio base station apparatus eNB communicates five-bit information containing three bits of the cyclic shift value "000" of the antenna port #0 as a reference and two bits of the difference value "10". Then, the difference of the cyclic shift value between antenna ports 19 of the mobile terminal apparatus U is "2" and the cyclic shift start points of the antenna ports #0, #1, #2, #3 are set to the "0", "3", "6", "9", and the antenna ports #0, #2 are set with the spreading code {1, 1} and the antenna ports #1, #3 are set with the spreading code {1, −1}.

In this way, as the difference value of the cyclic shift values is communicated, it becomes possible to set the cyclic shift start point and the spreading code for each antenna port 19 of the mobile terminal apparatus U with fewer control bits. Here, it is assumed that the cyclic shift value is of three bits and the difference value is of two bits, however, this is not intended for limiting the present invention. The size of control bits may vary in accordance with the number of choices of the cyclic shift start point and the size of the difference value.

Further, the radio base station apparatus eNB may communicate only the cyclic shift value for the antenna port 19 as a reference to set the start point and spreading code for each antenna port 19. In this case, the mobile terminal apparatus U is set to calculate the cyclic shift start point of the antenna port 19 based on the reference cyclic shift value.

For example, each antenna port 19 is set with a difference value from the reference cyclic shift value and the antenna port #0 is set with the difference value of "0", the antenna port #1 is set with the difference value of "2", the antenna port #2 is set with the difference value of "4", the antenna port #3 is set with the difference value of "6". Then, the radio base station apparatus eNB communicates the three bits of the cyclic shift value "000" of the antenna port #0 as a reference. With this structure, the cyclic shift start points of the antenna ports #0, #1, #2, #3 of the mobile terminal apparatus U are set to "0", "3", "6", "9", respectively, and the spreading code {1, 1} is set to the antenna ports #0 and #2 and the spreading code {1, −1} is set to the antenna ports #1 and #3.

In this way, as the mobile terminal apparatus U is configured to calculate the cyclic shift start point of each antenna port 19 from the cyclic value as a reference, it is possible to set the cyclic shift start point and spreading code with fewer control bits for each antenna port 19 of the mobile terminal apparatus U. Here, it is assumed in the description that the cyclic shift value is of three bits, but this is not intended for limiting the present invention. The size of bits for each control bit may vary in accordance with the selected number of the cyclic shift start point.

Further, the mobile terminal apparatus U may be structured to have a plurality of tables in which cyclic shift values, cyclic shift start points and spreading codes are associated with each other. In this case, the cyclic shift information generator 31 generates table selection information for selecting one from plural tables. The mobile terminal apparatus U receives table selection information from the radio base station apparatus eNB and uses a table specified by the table selection information.

The assignment information generator 32 generates assignment information of each user and communicates it to the mobile terminal apparatus U of the user via the transmitter 34 in the downlink. The assignment information is such that subcarriers correspond to resource blocks are assigned to users in accordance with a fixed set of rules by distributed FDMA and includes the number of users as assignment target (RPF) and assignment order (Comb). For example, if the demodulation reference signals are multiplexed between two users, the assignment information of two bits including one bit of RPF and one bit of Comb indicating the order is an odd number or even number is communicated to each mobile terminal apparatus U.

For example, when there is one user as assignment target, the first-symbol frequency band is all assigned to each mobile terminal apparatus U and demodulation reference signals don't orthogonalize each other between users. In this case, the RPF "1" is communicated by one bit from the radio base station apparatus eNB to each mobile terminal apparatus U.

On the other hand, when there are two users as assignment target, the subcarriers are assigned to each mobile terminal apparatus U alternately and demodulation reference signals are orthogonalized between the two users. In this case, the PRF "2" and Comb#0 indicating the order is an even number are communicated by two bits from the radio base station apparatus eNB to one mobile terminal apparatus U, and the PRF "2" and Comb#1 indicating the order is an odd number are communicated by two bits to the other mobile terminal apparatus U.

With this structure, as illustrated in FIG. 5, the user A is assigned the third-symbol, even-number-th subcarriers and the user B is assigned the third-symbol, odd-number-th subcarriers. In this way, the assignment information generator 32 generates RPF and Comb for each user and communicates them to the mobile terminal apparatus U of each user thereby to allow orthogonalizing of demodulation reference signals between users. Here, it is assumed that RPF is of one bit and Comb is of one bit, however, this is not intended for limiting the present invention. The size of bits of a control bit may vary in accordance with the number of users.

Besides, in this case, the Comb may be notified in the lower layer and the RPF may be notified in the higher layer by higher layer signaling or the like.

Further, the assignment information generator 32 may communicate only RPF as assignment information to the mobile terminal apparatus U instead of communicating the RPF and Comb to the mobile terminal apparatus U for each user. In this case, as illustrated in FIG. 8, the Comb is further associated with the table in which cyclic shift values of the mobile terminal apparatus U and cyclic shift start points are associated with each other. For example, the cyclic shift values of "000" to "011" are associated with Comb#0 and the cyclic shift values of "100" to "111" are associated with Comb#1.

With this structure, the assignment order in the mobile terminal apparatus U can be identified in accordance with the cyclic shift value communicated from the radio base station apparatus eNB. Therefore, it is not necessary to communicate a Comb value from the radio base station apparatus eNB to the mobile terminal apparatus U and it is possible to reduce the size of control bits for the assignment information. Here, it is assumed in the description that the RPF is a bit, however, this is not intended for limiting the present invention. The size of control bits may vary in accordance with the number of users.

In addition, the assignment information is not limited to RPF or Comb, and may be any information as far as it can be distributed by plural users in such a manner as to prevent overlapping of subcarriers.

The spreading code generator 33 generates a spreading code and an inverse spreading code for each user and communicates the spreading code via the transmitter 34 to the mobile terminal apparatus U of each user in the downlink. The spreading code is so-called an orthogonal code, and the demodulation reference signals of plural users are orthogonalized in the same symbol by block spreading. For example, if the demodulation reference signals are multiplexed in two users, the orthogonal code is communicated to each mobile terminal apparatus U by one bit.

For example, the orthogonal code {1, 1} is communicated to one mobile terminal apparatus U and the orthogonal code {1, −1} is communicated to the other mobile terminal apparatus U. With this structure, as illustrated in FIG. 6, reference signals of each mobile terminal apparatus U are multiplied with the respective orthogonal codes and the reference signals of the plural users are multiplexed in the same frequency band. In this way, the spreading code generator 33 generates an orthogonal code for each user and communicates it to the mobile terminal apparatus U of each user thereby to enable orthogonalizing of demodulation reference signals in users. Here, it is assumed that the orthogonal code is one bit, however, the present invention is not limited to this structure. The size of control bits may vary in accordance with the number of users.

In the thus-structured mobile terminal apparatus U, the demodulation reference signals are orthogonalized between antennas in accordance with the cyclic shift value and the demodulation reference signals are orthogonalized between users in accordance with the assignment or orthogonal code. Accordingly, the information demodulation reference signals can be orthogonalized even if the plural mobile terminal apparatus U have different serving cells and transmission bands or do not use shared ZC sequence.

Here, each part of the radio base station apparatus eNB and the mobile terminal apparatus U described above is realized by a CPU (Central Processing Unit) built in the apparatus calculating data in a RAM (Random Access Memory) in accordance with various control programs in a ROM (Read Only Memory) and executing processing in cooperation with a communication interface or the like.

Figure 9:
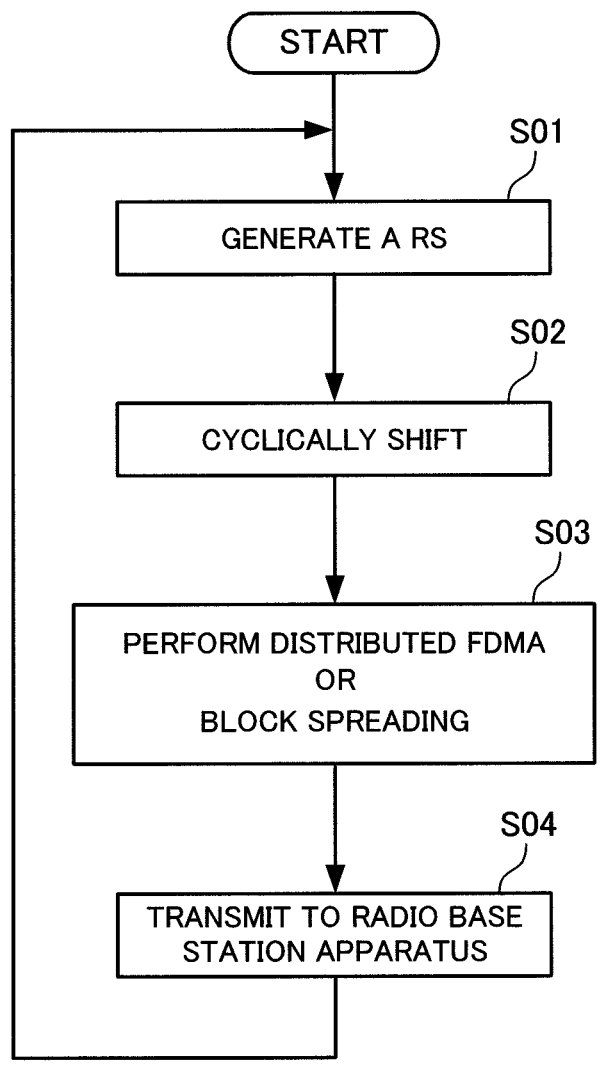
FIG. 9 is a flowchart of communication control processing of the mobile terminal apparatus according to the embodiment of the present invention.

With reference FIG. 9, description is made about communication control processing by the mobile terminal apparatus. FIG. 9 is a flow chart illustrating the communication control processing by the mobile terminal apparatus according to the embodiment of the present invention. In the initial state, the mobile terminal apparatus is notified of a cyclic shift value, assignment information and a spreading code from the radio base station apparatus.

As illustrated in FIG. 9, the demodulation reference signal generator 11 generates a demodulation reference signal having a ZC sequence as a signal sequence (step S01). Next, the cyclic shift section 13 cyclically shifts the demodulation reference signal based on the cyclic shift value in each of the antenna ports of the mobile terminal apparatus U (step S02). As this time, the demodulation reference signals are orthogonalized in each antenna ports of the mobile terminal apparatus U.

Next, the multiplexer 16 multiplexes the demodulation reference signal with a uplink data signal and the processing of distributed FDMA or block spreading is performed (step S03). At this time, for the mobile terminal apparatus U, demodulation reference signals are orthogonalized with a mobile terminal apparatus U of another user. Next, the IFFT section 17 and the CP adder perform respective processing and a signal is then transmitted to the radio base station apparatus eNB (step S04).

As described above, according to the mobile terminal apparatus U according to the present embodiment, the ZC sequence is used to generate a demodulation reference signal, demodulation reference signals are cyclically shifted in each of plural antenna ports, cyclically shifted plural uplink reference signals are transmitted to the radio base station apparatus eNB via corresponding plural antenna ports. Accordingly, it is possible to orthogonalize demodulation reference signals among antenna ports by cyclically shifting on each of the antenna ports and to multiplex and transmit them to the radio base station apparatus eNB.

Here, the embodiment has been described by way of example where demodulation reference signals are orthogonalized between antenna ports of mobile terminal apparatus by cyclic shifts, and further, the demodulation reference signals are orthogonalized in users by distributed FDMA or block spreading. However, the present invention is not limited to this structure. If orthogonalizing of demodulation reference signals between users is not required, the distributed FDMA or block spreading may be omitted here.

Further, in the above embodiment, the demodulation reference signals are orthogonalized in users by the distributed FDMA or block spreading. However, the present invention is not limited to this structure, and the demodulation reference signals may be orthogonalized in the users by combination of distributed FDMA and block spreading.

Furthermore, in the above embodiment, control bits for cyclic shift notified from the radio base station apparatus to the mobile terminal apparatus may be communicated to the mobile terminal apparatus in any structure. For example, the control bits may be communicated in a control channel such as PDCCH (Physical Downlink Control Channel), a broadcast channel such as a PBCH (Physical Broadcast Channel), a data shared channel such as PDSCH (Physical Downlink Shared Channel) or in a higher layers.

Furthermore, the embodiment disclosed here has been described for an illustrative purpose and is not intended for limiting the present invention. The scope of the present invention is defined by the claims, not by the above-described description and includes all modifications that are equivalent to or fall within the scope of the claims.

INDUSTRIAL APPLICABILITY

As described above, the present invention has an effect that it is possible to realize orthogonalizing of uplink reference signals in antennas in the MIMO transmission and is particularly useful in a radio terminal apparatus, a radio base station apparatus and a communication control method for transmitting demodulation reference signals in the uplink.

The present application is based on the Japanese Patent Application No. 2009-149000 filed on Jun. 23, 2009, the Japanese Patent Application No. 2010-001127 filed on Jan. 6, 2010 and the Japanese Patent Application No. 2010-086034 filed on Apr. 2, 2010, entire contents of which are incorporated by reference herein.

The invention claimed is:

1. A mobile terminal apparatus comprising:
a reference signal generator configured to generate an uplink reference signal with use of a signal sequence which is orthogonalized by shifting a start point;
a cyclic shift section configured to cyclically shift a plurality of the uplink reference signals so that the uplink reference signals are orthogonalized;
a spreading section configured to obtain orthogonal codes for orthogonalizing the uplink reference signals from a radio base station apparatus and make the uplink reference signals able to be orthogonalized between users based on the orthogonal codes; and
a transmitter configured to transmit the cyclically shifted uplink reference signals to the radio base station apparatus via a plurality of antenna ports in an uplink,
wherein the transmitter is able to transmit, via the antenna ports, the uplink reference signals comprising first to fourth uplink reference signals,
the spreading section applies a first orthogonal code to the first and second uplink reference signals and applies a second orthogonal code, which is different from the first orthogonal code, to the third and fourth uplink reference signals, and
the cyclic shift section cyclically shifts the uplink reference signals in such a manner that cyclic shift values of the first and second uplink reference signals are shifted from each other by a half of total resources, cyclic shift values of the third and fourth uplink reference signals are shifted from each other by the half of total resources and the cyclic shift values of the respective uplink reference signals differ from each other.

2. The mobile terminal apparatus of claim 1, wherein the cyclic shift section cyclically shifts each of the uplink reference signals based on an assignment pattern indicated in pattern information obtained from the radio base station apparatus out of plural assignment patterns of the cyclic shift values for the uplink reference signals.

3. The mobile terminal apparatus of claim 1, wherein the cyclic shift section cyclically shifts the uplink reference signals based on the cyclic shift values assigned to the uplink reference signals on a basis of a cyclic shift value of an uplink reference signal as a reference.

4. The mobile terminal apparatus of claim 1, wherein the cyclic shift section cyclically shifts the uplink reference signals based on a setting condition indicated in setting selecting information obtained from the radio base station apparatus out of setting conditions for assigning the cyclic shift values to the uplink reference signals on a basis of the cyclic shift value of an uplink reference signal as a reference, the cyclic shift value of the uplink reference signal as the reference and the orthogonal codes.

5. The mobile terminal apparatus of claim 1,
wherein the cyclic shift section obtains the cyclic shift values from the radio base station apparatus and cyclically shifts the uplink reference signals based on the cyclic shift values and
the spreading section spreads the uplink reference signals with use of the orthogonal codes that are associated with the cyclic shift values obtained from the radio base station apparatus.

6. The mobile terminal apparatus of claim 1, wherein the half of total resources is six resources.

7. A radio base station apparatus comprising
a cyclic shift information generator configured to generate cyclic shift information for cyclically shifting uplink reference signals transmitted from a plurality of antenna ports of a mobile terminal apparatus and generated with use of signal sequences which are orthogonalized by shifting respective start points and orthogonalizing the uplink reference signals;

a spreading code generator configured to generate, for the mobile terminal apparatus, orthogonal code information for orthogonalizing the uplink reference signals between users; and a transmitter configured to transmit the cyclic shift information and the orthogonal code information to the mobile terminal apparatus in a downlink, wherein, when the transmitter is able to transmit, via the antenna ports, the uplink reference signals comprising first to fourth uplink reference signals, the spreading code generator applies a first orthogonal code to the first and second uplink reference signals and applies a second orthogonal code, which is different from the first orthogonal code, to the third and fourth uplink reference signals, and the cyclic shift information is such that cyclic shift values of the first and second uplink reference signals are shifted from each other by a half of total resources, cyclic shift values of the third and fourth uplink reference signals are shifted from each other by the half of total resources and the cyclic shift values of the respective uplink reference signals differ from each other.

8. The radio base station apparatus of claim 7, wherein the cyclic shift information includes setting selecting information indicating one of setting conditions for assigning the cyclic shift values to the uplink reference signals on a basis of a cyclic shift value of an uplink reference signal as a reference, the orthogonal codes and the cyclic shift value of an uplink reference signal as a reference.

9. The radio base station apparatus of claim 7, wherein the cyclic shift information is the cyclic shift values for cyclically shifting the uplink reference signals of the mobile terminal apparatus and the cyclic shift values are associated with the orthogonal codes for spreading the uplink reference signals to be orthogonalized between the users.

10. The radio base station apparatus of claim 7, wherein the half of total resources is six resources.

11. A communication control method between a radio base station apparatus and a mobile terminal apparatus comprising steps of:

the immobile terminal apparatus generating uplink reference signals with use of signal sequences which are orthogonalized by shifting respective start points;

the mobile terminal apparatus cyclically shifting the uplink reference signals to orthogonalize the uplink reference signals;

the mobile terminal apparatus obtaining orthogonal codes for orthogonalizing the uplink reference signals from the radio base station apparatus and making the uplink reference signals able to be orthogonalized between users based on the orthogonal codes; and the mobile terminal apparatus transmitting the cyclically shifted uplink reference signals to the radio base station apparatus via a plurality of antenna ports in an uplink, wherein, when being able to transmit the uplink reference signals comprising first to fourth uplink reference signals via the antenna ports, a first orthogonal code is applied to the first and second uplink reference signals and a second orthogonal code, which is different from the first orthogonal code, is applied to the third and fourth uplink reference signals, and the uplink reference signals are cyclically shifted in such a manner that cyclic shift values of the first and second uplink reference signals are shifted from each other by a half of total resources, cyclic shift values of the third and fourth uplink reference signals are shifted from each other by the half of total resources and the cyclic shift values of the respective uplink reference signals differ from each other.

12. The communication control method of claim 11, wherein the half of total resources is six resources.

* * * * *